Patented Dec. 9, 1941

2,265,585

UNITED STATES PATENT OFFICE 2,265,585

PROCESS FOR LIQUID PURIFICATION

Oliver M. Urbain and William R. Stemen, Columbus, Ohio, assignors to Charles H. Lewis, Harpster, Ohio No Drawing. Application January 12, 1938, Serial No. 184,708

8 Claims. (Cl. 210—24)

This invention relates to water softening and liquid purification. More specifically, it relates to the removal of cations from liquids by a process of cation or base exchange.

Processes of water softening and cation removal have been known for a number of years. Perhaps the most commonly used materials are the zeolites, or alumino-silicates, although many other compounds having base exchange properties have been prepared. Such compounds, however, are not satisfactory for use in waters of high acidity since they tend to break down and lose their physical structure when brought into contact with acids.

It is an object of this invention to provide processes for water softening and liquid purification employing materials which will function satisfactorily in acid mediums. It is a further object to provide materials for base exchange having a high capacity for cations. Additionally, it is an object of this invention to provide a process for cation exchange which will permit the regeneration of the materials employed without appreciable loss. Other objects will be apparent to those skilled in the art from the following description of the processes and materials employed.

The materials employed in the processes of this invention are the poly-acidic esters of poly-hydroxy organic compounds and their salts. These materials are prepared by the reaction between poly-basic acids and poly-hydroxy organic compounds, this reaction yielding the poly-acidic esters of poly-hydroxy organic compounds. Such esters may, if desired, be converted into their salts by replacing their exchangeable hydrogen with other cations, and such salts are to be understood as included by the term "poly-acidic esters of poly-hydroxy organic compounds" as used throughout the specification and claims.

The poly-basic acids employed for the preparation of the preferred exchange compounds are those acids which contain two or more theoretical acid hydrogen atoms per molecule. Exemplary of such acids are phosphoric acid, $H_3PO_4$, and sulfuric acid, $H_2SO_4$.

The poly-hydroxy organic compounds employed are such compounds as cotton, cellulose, starch, maltose, chitin, etc. Any organic compounds containing two or more hydroxy groups in reactive positions may be used to produce the esters employed in the processes herein described.

A general equation for the formation of poly-acidic esters of poly-hydroxy organic compounds may be expressed as follows:

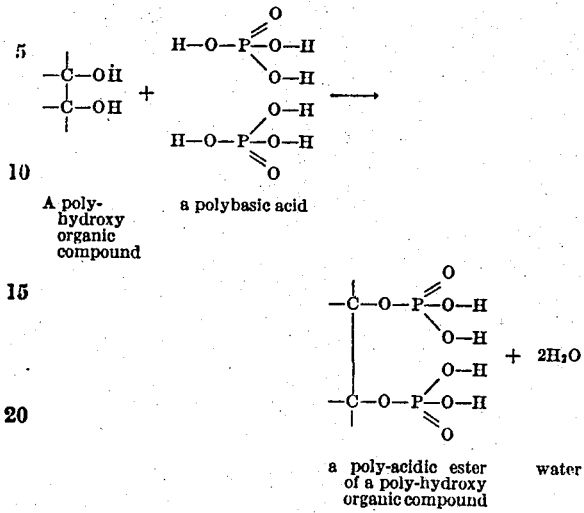

The foregoing equation represents the formation of a desired ester through the reaction of a poly-hydroxy organic compound, which has been represented by the formula

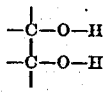

and a poly-basic acid such as phosphoric acid. It will be observed that in this reaction the resulting ester possesses at least four replaceable hydrogen atoms. The hydroxy groups of the poly-hydroxy organic compounds have combined with two acidic hydrogen atoms and have split off as two molecules of water. The operativeness of such materials depends upon the tying together of the poly-hydroxy organic compounds with a poly-basic acid through one or more, but not through all, of the replaceable hydrogens. The remaining replaceable hydrogens are thus left free to effect cation exchange.

Exemplary of the processes employed to produce such materials are the following examples:

Example 1

A good grade of cotton was treated with phosphoric acid in excess at room temperature for a period of about three hours. There was obtained a cellulose acid phosphate gel which was freed of excess acids by washing with cold water. This gel was subsequently pressed into a compact particle form. The equation for the preparation of this compound follows:

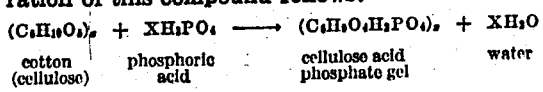
cotton (cellulose)    phosphoric acid    cellulose acid phosphate gel    water

Example 2

Starch bisulfate, a suitable compound for use in water softening and purification, was prepared by treating starch with sulfuric acid under the same conditions as those given in Example 1 above, in accordance with the following equation:

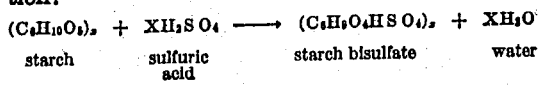
starch    sulfuric acid    starch bisulfate    water

These and other materials obtained by methods similar to the above were found to possess a high capacity for base exchange, were quite stable in acid solution, and could be quickly and satisfactorily regenerated without appreciable loss.

The poly-acidic esters of poly-hydroxy organic compounds may be converted into their salts by treatment with solutions containing cations which will replace the exchangeable hydrogen ions. For example, the calcium ester of cellulose acid phosphate may be prepared by treating the material obtained in Example 1, above, with a concentrated solution of calcium chloride. The equation for the preparation of the calcium ester of cellulose acid phosphate reads as follows:

$(C_6H_9O_4H_2PO_4)_2$ + $XCaCl_2$ ⟶ cellulose acid phosphate    calcium chloride solution $(C_6H_9O_4CaPO_4)_2$ + $XHCl$ calcium ester of cellulose acid phosphate    hydrochloric acid Suitable materials may also be prepared by the direct action of the halides of poly-basic acids on poly-hydroxy compounds.

It will thus be observed that the materials employed in this process conform in general to the following structural formula or modifications thereof:

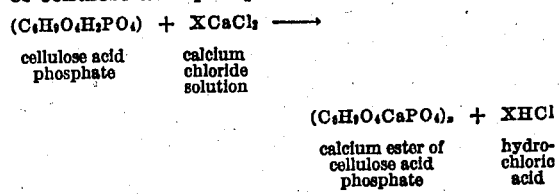

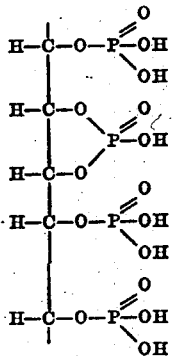

The essential characteristics of such materials are their formation through the reaction of poly-basic acids with poly-hydroxy organic compounds and their available replaceable hydrogen resulting from the incomplete reaction of the acidic hydrogens with the hydroxy groups of the organic compounds. The reaction products are solid materials having a solubility of less than 0.03 gram per 100 cc. of water at 20° C.

The base exchange materials thus prepared are employed in water softening or liquid purification in conventional methods. They may be utilized in contact filters and adapted to use in the filter bed type of water softening apparatus. Or such materials may be added directly to the liquid with agitation, after which the converted exchange compounds are separated and removed from the softened water or purified liquids.

Reactions of poly-acidic esters of poly-hydroxy organic compounds or their salts with hardness forming cations or with organic cations, which one may be desirous of removing from a solution, are given in the following three equations. For purposes of illustration, the exchange material is shown as containing only one active group, but it should be understood that such materials may contain a plurality of such active groups.

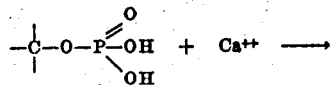

a phosphoric ester of a poly-hydroxy organic compound    calcium cation

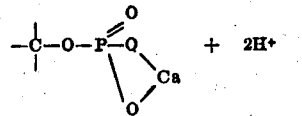

calcium salt of a phosphoric ester of a poly-hydroxy organic compound    hydrogen cation

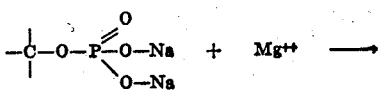

sodium salt of a phosphoric ester of a poly-hydroxy organic compound    magnesium cation

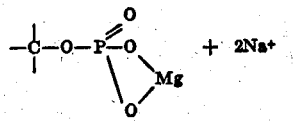

magnesium salt of a phosphoric ester of a poly-hydroxy organic compound    sodium cation

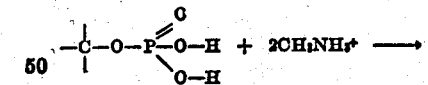

a phosphoric ester of a poly-hydroxy organic compound    methyl ammonium cation

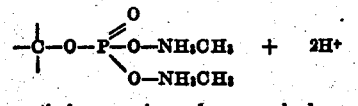

methyl ammonium phosphoric ester of a poly-hydroxy organic compound    hydrogen cation Although the above equations show the use of esters of phosphoric acids and poly-hydroxy organic compounds only, it will be understood that the esters, or their salts, of other poly-basic acids, or their halides, with polyhydroxy organic compounds are equally suitable for water softening and cation exchange in accordance with this invention.

After the exchange materials have become exhausted, they may be regenerated by treating with solutions of acids, salts, or bases. A preferred process of regeneration involves the treating of the exhausted exchange material with solutions containing from 2% to 8% of mineral acids. The regenerating solutions may be flowed through the exchange material in the conventional regeneration process, or the exhausted exchange material may be treated with the regenerating liquid in vats or containers.

The regeneration of a phosphoric acid ester of a poly-hydroxy organic compound which has been used to remove calcium ions from water may be illustrated by the following equation:

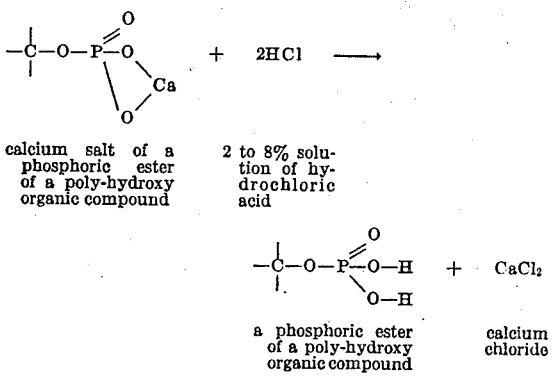

calcium salt of a phosphoric ester of a poly-hydroxy organic compound 2 to 8% solution of hydrochloric acid a phosphoric ester of a poly-hydroxy organic compound calcium chloride The cations removed from the water treated will, of course, be found in the regenerating solution, and, if recovery is desired, they can be removed by conventional methods such as fractional distillation or fractional crystallization.

It is to be expressly understood that the foregoing description and examples are merely illustrative and are not to be considered as limiting this invention beyond the scope of the subjoined claims.

Having thus described our invention, we claim:

1. A process for the purification of aggressive waters which comprises exchanging cations therein by contacting the water with a solid, water-insoluble poly-acidic ester of a poly-hydroxy organic compound having available replaceable cations.

2. A process of water purification which comprises removing hardness-forming cations by contacting the water with a solid, water-insoluble poly-acidic ester of a poly-hydroxy organic compound selected from the group consisting of cotton, cellulose, starch, maltos and chitin having available replaceable cations.

3. A process for exchanging cations in aggressive waters which comprises contacting the water with a poly-acidic ester of a solid poly-hydroxy organic compound characterized in that it has available replaceable hydrogen, is stable and insoluble in said water.

4. A process for exchanging cations in aggressive waters which comprises the steps of adding a solid, water-insoluble poly-acidic ester of a poly-hydroxy organic compound having available replaceable hydrogen to the water, agitating for a short period, and effecting removal of the converted exchange material.

5. A process for exchanging cations in aggressive waters which comprises the step of passing the water through a filter charged with a solid, water-insoluble poly-acidic ester of a poly-hydroxy organic compound having available replaceable cations.

6. A process of water purification which comprises exchanging cations by subjecting the water to the action of solid water-insoluble organic esters containing replaceable cations and prepared by the reaction between poly-basic acids and poly-hydroxy organic compounds selected from the class consisting of cotton, cellulose, starch, maltos and chitin.

7. A process of water purification which comprises removing hardness-forming cations by contacting the water with a solid water-insoluble highly acidic ester of cotton, said ester having available replaceable cations.

8. A process of water purification which comprises removing hardness-forming cations by contacting the water with a solid water-insoluble highly acidic ester of starch, said ester having available replaceable cations.

OLIVER M. URBAIN.
WILLIAM R. STEMEN.